(12) United States Patent
Bosua et al.

(10) Patent No.: US 11,310,876 B2
(45) Date of Patent: Apr. 19, 2022

(54) SWITCH AND METHOD OF OPERATION

(71) Applicant: LIFI Labs, Inc., San Francisco, CA (US)

(72) Inventors: Phillip Bosua, San Francisco, CA (US); Marc Alexander, San Francisco, CA (US)

(73) Assignee: LIFI Labs, Inc., San Francisco, CA (US)

(*) Notice: Subject to any disclaimer, the term of this patent is extended or adjusted under 35 U.S.C. 154(b) by 0 days.

(21) Appl. No.: 16/159,406

(22) Filed: Oct. 12, 2018

(65) Prior Publication Data
US 2019/0059146 A1 Feb. 21, 2019

Related U.S. Application Data

(63) Continuation of application No. 15/501,699, filed as application No. PCT/US2015/039387 on Jul. 7, 2015, now Pat. No. 10,129,965.

(60) Provisional application No. 62/021,524, filed on Jul. 7, 2014.

(51) Int. Cl.
| H05B 39/04 | (2006.01) |
| F21V 23/04 | (2006.01) |
| F21V 23/02 | (2006.01) |
| H05B 47/19 | (2020.01) |
| H05B 45/20 | (2020.01) |
| H05B 45/00 | (2022.01) |
| H05B 47/11 | (2020.01) |

(52) U.S. Cl.
CPC ......... *H05B 39/041* (2013.01); *F21V 23/023* (2013.01); *F21V 23/0492* (2013.01); *H05B 45/00* (2020.01); *H05B 47/11* (2020.01); *H05B 47/19* (2020.01); *H05B 45/20* (2020.01)

(58) Field of Classification Search
CPC .............. H05B 39/041; H05B 33/0842; H05B 33/0845; H05B 33/0863; H05B 3/0218; H05B 37/0272; F21V 23/023; F21V 23/0492
USPC ........................................................ 315/129
See application file for complete search history.

(56) References Cited

U.S. PATENT DOCUMENTS

| 5,710,545 | A | 1/1998 | Dunn |
| 5,841,428 | A | 11/1998 | Jaeger et al. |
| 5,914,669 | A | 6/1999 | Wicks et al. |
| 6,003,206 | A | 12/1999 | Hall et al. |
| 6,624,368 | B2 * | 9/2003 | Sato ........................ H01H 9/181 200/310 |
| 6,726,112 | B1 | 4/2004 | Ho |
| 7,103,460 | B1 | 9/2006 | Breed |

(Continued)

*Primary Examiner* — Dylan C White
(74) *Attorney, Agent, or Firm* — Jeffrey Schox; Diana Lin

(57) ABSTRACT

A control system including: a base including a central axis; a knob rotatably connected to the base, the knob rotatable about the central axis; a plurality of individually indexed light emitting elements distributed along the base perimeter and arranged to direct light radially outward of the central axis; a diffuser arranged radially outward of the light emitting elements; a wireless communication module enclosed between the knob and base; and a processor enclosed between the knob and base, the processor connected to the wireless communication mechanism and plurality of light emitting elements, the processor configured to individually control each light emitting element based on a control signal received from the wireless communication mechanism.

19 Claims, 6 Drawing Sheets

(56) References Cited

U.S. PATENT DOCUMENTS

| | | | |
|---|---|---|---|
| 7,205,495 B2 | 4/2007 | Mazur | |
| 7,339,128 B2* | 3/2008 | Yen | H05B 45/00 |
| | | | 200/314 |
| 7,598,885 B2 | 10/2009 | Kwon et al. | |
| 7,667,163 B2* | 2/2010 | Ashworth | F24F 11/30 |
| | | | 219/502 |
| 7,980,726 B2 | 7/2011 | Joosen et al. | |
| 8,195,313 B1* | 6/2012 | Fadell | G05D 23/1919 |
| | | | 700/83 |
| 8,723,794 B2 | 5/2014 | Corson et al. | |
| 8,786,196 B2* | 7/2014 | Biery | H05B 39/041 |
| | | | 315/149 |
| 8,788,966 B2 | 7/2014 | Josephson et al. | |
| 8,829,799 B2 | 9/2014 | Recker et al. | |
| 9,049,756 B2 | 6/2015 | Klusmann et al. | |
| 9,113,528 B2* | 8/2015 | Bora | H05B 47/19 |
| 9,247,625 B2 | 1/2016 | Recker et al. | |
| 9,338,864 B2* | 5/2016 | Bosua | F21V 23/023 |
| 9,538,619 B2 | 1/2017 | Swatsky et al. | |
| 2010/0194687 A1 | 8/2010 | Corson et al. | |
| 2010/0198425 A1* | 8/2010 | Donovan | G05D 23/1904 |
| | | | 700/299 |
| 2012/0025717 A1 | 2/2012 | Klusmann et al. | |
| 2013/0163226 A1* | 6/2013 | Chen | G05G 1/105 |
| | | | 362/85 |
| 2013/0193847 A1 | 8/2013 | Recker et al. | |
| 2014/0117859 A1 | 5/2014 | Swatsky et al. | |
| 2014/0152188 A1* | 6/2014 | Bora | H05B 47/19 |
| | | | 315/210 |
| 2015/0141755 A1 | 5/2015 | Tesar | |
| 2015/0189721 A1 | 7/2015 | Karc et al. | |
| 2015/0208900 A1 | 7/2015 | Vidas et al. | |
| 2018/0301301 A1* | 10/2018 | Bach | H03K 17/941 |

* cited by examiner

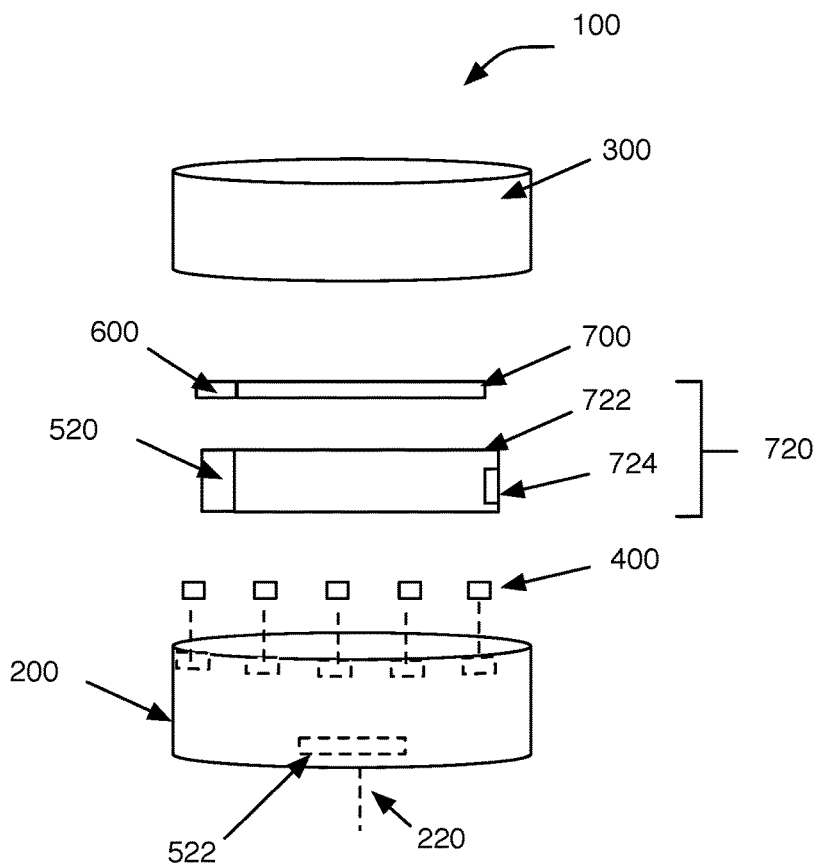
FIGURE 1
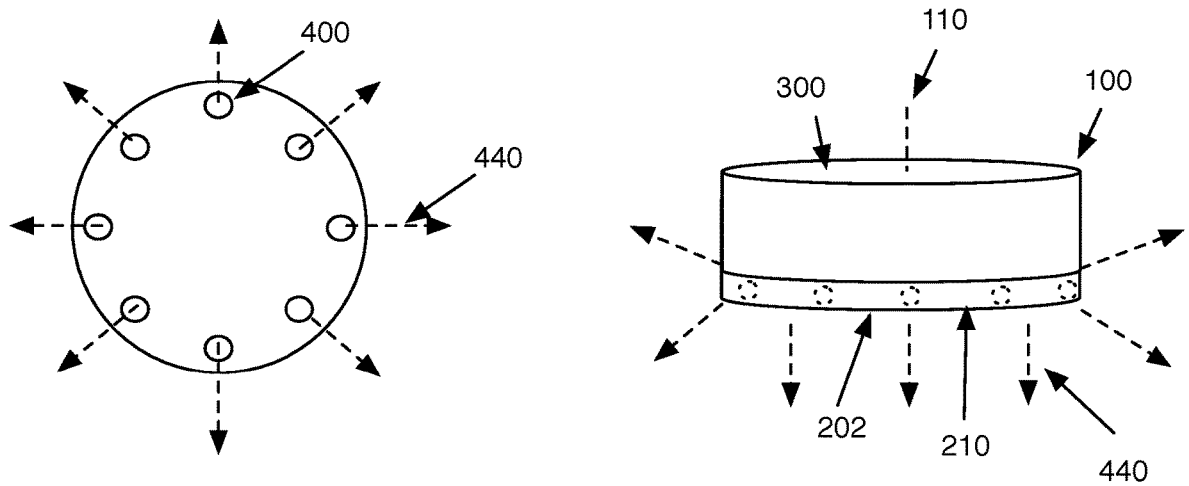
FIGURE 2A
FIGURE 2B

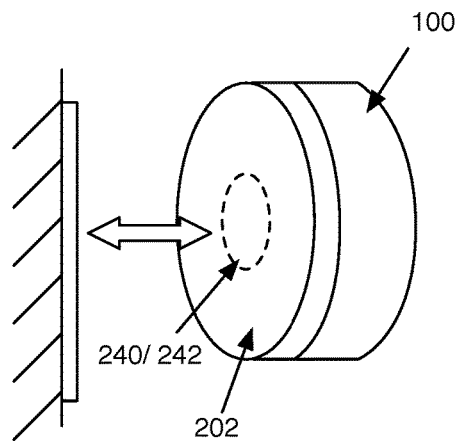
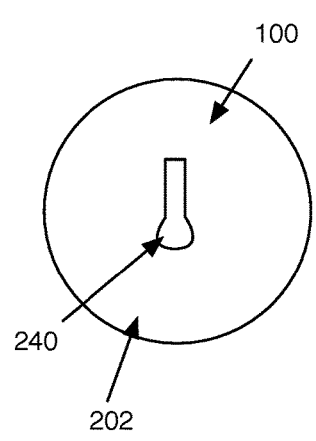
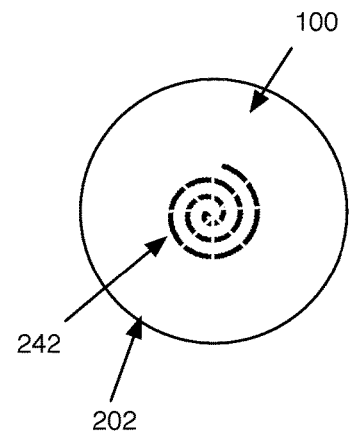
FIGURE 6A  FIGURE 6B  FIGURE 6C
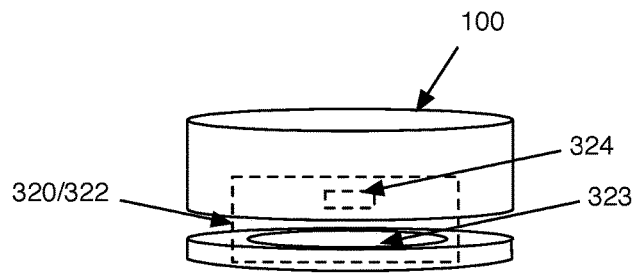
FIGURE 7
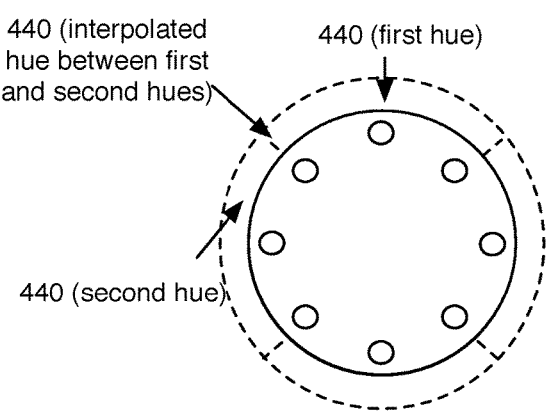
FIGURE 8

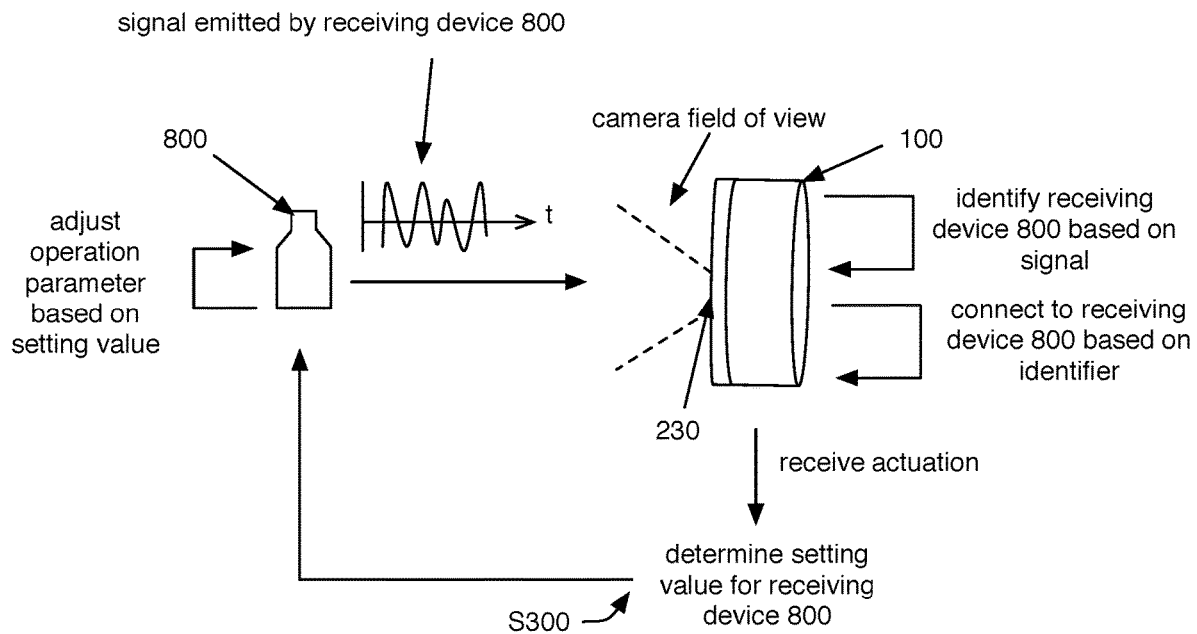
FIGURE 9
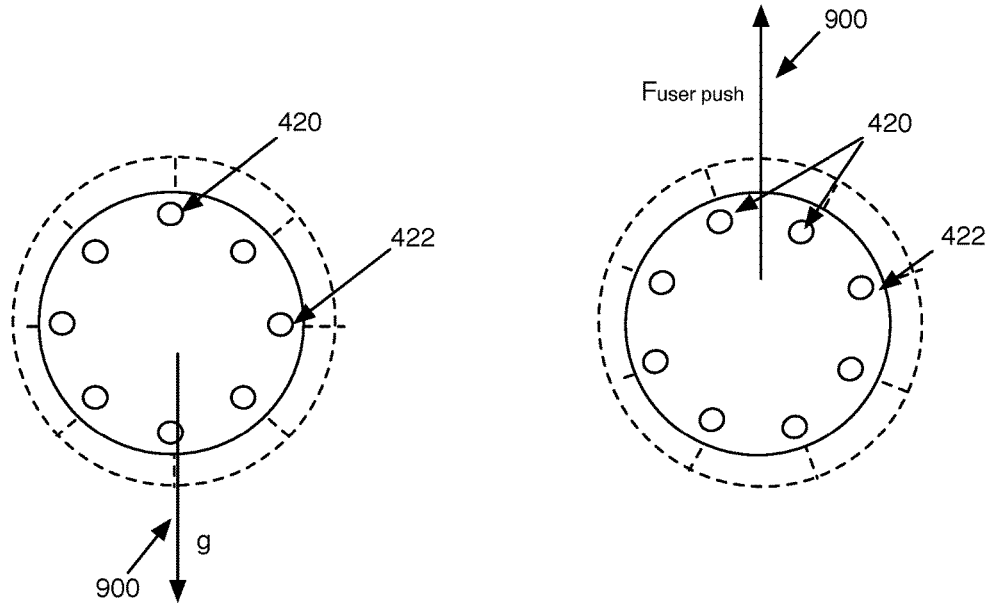
FIGURE 10
FIGURE 11

SWITCH AND METHOD OF OPERATION

CROSS-REFERENCE TO RELATED APPLICATIONS

This application is a continuation of U.S. application Ser. No. 15/501,699, filed 3 Feb. 2017, which is a 371 of PCT Application number PCT/US15/39387, filed 7 Jul. 2015, which claims the benefit of U.S. Provisional Application No. 62/021,524, filed 7 Jul. 2014, all of which are incorporated in their entirety by this reference.

TECHNICAL FIELD

This invention relates generally to the control systems field, and more specifically to a new and useful switch in the control systems field.

BRIEF DESCRIPTION OF THE FIGURES

FIG. 1 is an exploded view of a variation of the switch.

FIG. 2A is a plan view of a variation of the base including a set of light emitting elements in operation.

FIG. 2B is an elevation view of a variation of the switch in operation

FIGS. 6A, 6B, and 6C are a first, second, and third example of mounting mechanisms.

FIG. 7 is a plan view of a variation of the switch in operation, visually representing the proximity of a variable value (e.g., temperature) relative to a first and second end of a continuum (e.g., hot or cold), wherein the first and second end of the continuum are represented by a first and second hue, respectively, and the proximity of the variable value to a given end is represented by the percentage of arcuate area displaying the respective hue.

FIG. 8 is a plan view of a variation of the switch in operation, visually representing a plurality of setting value options available for the receiving device, wherein the setting value options are each represented by a hue.

FIG. 9 is a schematic representation of receiving device identification and control by a switch.

FIG. 10 is a schematic representation of a variation of first light emitting element selection.

FIG. 11 is a schematic representation of a second variation of first light emitting element selection.

DESCRIPTION OF THE PREFERRED EMBODIMENTS

Figure 3:
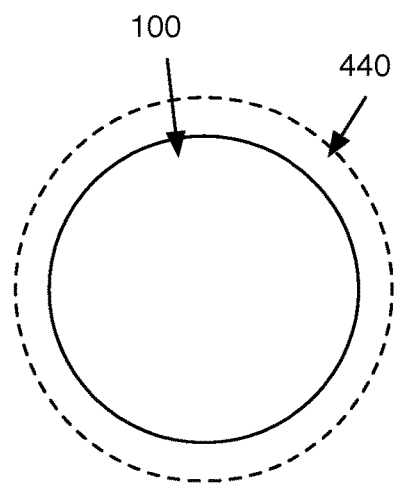
FIG. 3 is a plan view of a variation of the switch in operation.
Figure 4:
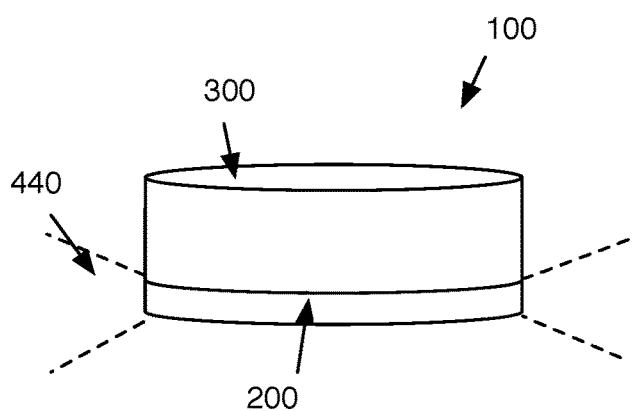
FIG. 4 is an elevation view of a second variation of the switch in operation.
Figure 5:
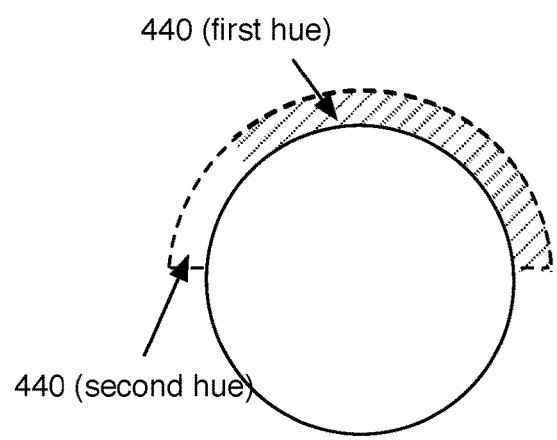
FIG. 5 is a schematic representation of a variation of a rotary encoder.

The following description of the preferred embodiments of the invention is not intended to limit the invention to these preferred embodiments, but rather to enable any person skilled in the art to make and use this invention.

1. Control System

As shown in FIG. 1, the control system 100 (the "switch") includes a base 200, a rotary mechanism 300, a set of indexed light emitting elements 400, a set of sensors 500, and a communication mechanism 600. The switch 100 can additionally include a speaker, screen, or any other suitable output. The switch 100 can additionally include a motor (e.g., an AC motor, DC motor, etc.) that functions to control rotary mechanism rotation.

The switch 100 functions as an input to control a receiving device 800. The receiving device 800 can be a connected lightbulb, a system of lightbulbs, a hub controlling a system of lightbulbs, an HVAC system (e.g., air conditioning system), a music system, a computer, an entryway (e.g., a door or door lock), a window blind or tint system, a remote control shutter, a notification sending device, an occupancy sensor, a voice command input, or any other suitable system that can be controlled with a user input. The receiving device 800 functions to receive information from the switch. The information can be a setting value, a setting value differential (e.g., the difference between a first and a second setting value), a control command (e.g., determined by the switch based on the setting value or setting value differential), or any other suitable information. The receiving device can additionally function to send information to the switch. The sent information can include display information, sensor information, or any other suitable information. For example, the switch can be used to control the intensity, hue, saturation, or any other suitable parameter of a lighting system.

The switch 100 can additionally function as an output for a sending device that sends the switch information for visualization. The sending device can be a notification system, a mobile device (e.g., a smartphone, tablet, etc.), a remote computing system or server (e.g., wherein the remote computing system is connected to the switch through the Internet), a receiving device (e.g., a lightbulb) or any other suitable device capable of sending information that can be visualized to the switch. Using the hue, intensity, or any other suitable light parameter, or the speaker or any other suitable switch output, the switch can present a representation of the ambient temperature (e.g., wherein the number of light emitting elements emitting red or blue correspond with how hot or cold the temperature is, respectively), a gauge (e.g., the value of a stock, SOC of a battery or power system, etc.), a music visualizer, an earthquake visualizer (e.g., based on data received from a remote computing system or wherein remote receiving devices, such as connected lights, can additionally function as vibration sensors), a clock, doorbell, or any other suitable output. However, the switch can be otherwise used.

In one specific example, the receiving device 800 is a second set of light emitting elements, wherein the switch controls the second set of light emitting elements. The second set of light emitting elements stores a hue and intensity setting, wherein the light emitting elements emit light at the stored hue and intensity in response to receipt of sufficient electrical power. In response to determination of a display event at the switch, the switch requests the stored light parameters from the second set of light emitting elements, receives the stored light parameters, and operates based on the received light parameters. The switch can additionally receive user input, wherein the switch or second set of light emitting elements can determine a second setting value (e.g., a hue or an intensity setting) based on the input. The second set of light emitting elements is preferably controlled to meet the second setting value.

The base 200 of the switch 100 functions to support the remaining components of the switch. The base 200 preferably supports the rotary mechanism, the set of light emitting elements 400, the sensors 500, the communication mechanism 600, the power system, and/or any other suitable mechanism. However, the switch components can alternatively be supported by the rotary mechanism or by any other suitable component. The base 200 can define a central axis 220, a first broad face 202 (e.g., external broad face) substantially perpendicular the central axis (e.g., within a margin of error), a second broad face opposing the first broad face across a base thickness (e.g., internal broad face), and a set of sidewalls joining the first and second broad faces. The central axis can be coaxial with the rotary mechanism axis of rotation (rotary axis 110), parallel the rotary axis, or be otherwise arranged relative to the rotary axis. The first and second broad faces can be planar, curved (e.g., concave or convex), or otherwise profiled. The walls can be flat, arcuate (e.g., curved) about the central axis, arcuate about a plane perpendicular the central axis, or have any other suitable profile. The base 200 preferably has the same cross-section as the rotary mechanism (e.g., circular), but can alternatively have a different cross-section. Examples of base profiles include a circular cross section, polygonal cross section (e.g., triangular, square, rectangular, etc.), or any other suitable cross section. The base can additionally include a bevel along the edge distal the rotary mechanism, be a right cylinder, or have any other suitable configuration.

The base 200 can additionally function to adjust the optical properties of the light emitted by the set of light emitting elements 400. All or a portion of the base 200 is preferably clear, but can alternatively be frosted or be opaque. The base 200 preferably defines a series of light channels arranged along the base perimeter, wherein each light channel is configured to receive and/or retain one or more light emitting elements of the set. The light channels preferably extend radially outward of the central axis, but can alternatively be arcuate channels, linear channels perpendicular the central axis, linear channels parallel the central axis, or be arranged in any other suitable configuration. Alternatively, the light channels can be light pipes that transmit light from an internal light emitting element to the base perimeter. The light transmission, opacity, reflectance, diffusivity, and/or any other suitable light parameter of the light channel walls can be tailored to increase emitted light efficiency, increase light resolution, increase blending of adjacent lights, or adjust any other suitable light parameter.

The base 200 can additionally include one or more apertures 230 that form a light channel optically connected to a camera or other light sensor. The aperture is preferably defined within a first broad face 202 of the base 200 distal the rotational mechanism, but can alternatively be defined along a portion of the arcuate surface of the base (e.g., perpendicular the first broad face of the base) or along any other suitable portion of the base.

The base 200 of the switch 100 can additionally include a diffuser 210. The diffuser 210 can be defined by the base or be a separate component. The diffuser 210 is preferably arranged radially outward of the light emitting elements 400 (e.g., encapsulate the light emitting elements 400 within the switch 100), but can be arranged in any other suitable position. The diffuser 210 can be arranged coplanar with the light channels or be arranged in any other suitable position. The light transmission, opacity, reflectance, diffusivity, and/or any other suitable light parameter of the diffuser can be tailored to increase emitted light efficiency, increase light resolution, increase blending of adjacent lights, or adjust any other suitable light parameter.

The base 200 of the switch 100 can additionally include a mounting mechanism 240 that functions to mount the switch to a complimentary mounting mechanism. The mounting mechanism can mount the switch to a vertical surface (e.g., a wall), with the plane of the broad face of the switch parallel to a gravity vector, or to any other suitable surface. As shown in FIGS. 6A and 6C, the mounting mechanism can include a magnetic mechanism 242 that induces a magnetic field attracted to a complimentary magnetic field induced by the complimentary mounting mechanism. Examples of magnetic mounting mechanisms include electromagnets, permanent magnets, ferrous materials, soft magnets, or include any other suitable magnet. The mounting mechanism can additionally or alternatively include a tongue, a groove (e.g., as shown in FIG. 6B), adhesive, microsuction coating, hooks, or any other suitable coupling mechanism.

The rotary mechanism 300 of the switch 100 functions as a user input to the switch. The angular position of the rotary mechanism 300 about the rotational axis 110 can be indicative of (e.g., correspond to) a setting value for the receiving device. In one variation of the switch 100, the angular position of the rotary mechanism relative to a predetermined position on the base corresponds to a specific setting value for the receiving device. In a second variation of the switch, the angular position of the rotary mechanism relative to a first, starting angular position of the rotary mechanism (e.g., the delta, or the differential between the starting and ending angular position of the rotary mechanism 300 relative to the base 200) can correspond to a specific setting value for the receiving device. However, the rotary mechanism 300 can otherwise control the receiving device.

The rotary mechanism 300 (dial, knob, etc.) is preferably actuatable relative to a rotation axis 110. The rotation axis 110 is preferably coaxial with the base central axis 220, but can alternatively be offset from the base central axis 220. The rotary mechanism 300 preferably rotates arcuately about the axis of rotation 110. The rotary mechanism 300 is preferably capable of rotating freely in either direction (e.g., clockwise or counterclockwise), but can alternatively be arcuately limited (e.g., to rotating in a single direction, be ratcheted, etc.). The rotary mechanism 300 can additionally actuate along a vector parallel to the axis of rotation (e.g., depressable toward the base or capable of being pulled away from the base), wherein the rotary mechanism 300 can additionally include a spring, magnet, or other return mechanism that returns the rotary mechanism 300 to a resting position along the actuation vector relative to the base 200 in response to receipt of the actuating force along the actuation vector. Alternatively, the rotary mechanism 300 can be a touch sensor (e.g., capacitive touch sensor arranged along the top of the switch distal the base, but alternatively otherwise located), wherein the angular position of the sensed touch relative to a reference point can be used as the input in lieu of the angular position of the physical rotary mechanism.

The rotary mechanism 300 can include a position sensing mechanism 320 that functions to determine the rotary mechanism position relative to a starting position. The position sensing mechanism 320 preferably dynamically determines the instantaneous rotary mechanism position relative to a starting position, but can alternatively determine the relative rotary mechanism position in response to a determination event (e.g., in response to the rotary mechanism angular speed falling below a predetermined angular velocity, etc.). The resolution of the sensed rotary mechanism position and/or the mapped setting value preferably varies as a function of the rotary mechanism angular speed. For example, the mapped setting value changes at a first rate response to a first angular displacement of the rotary mechanism when the rotary mechanism rotates at a first angular velocity, and the mapped setting value changes at a second rate (e.g., faster or slower than the first rate) in response to the first angular displacement of the rotary mechanism when the rotary mechanism rotates at a second angular velocity (e.g., faster or slower than the first rate). However, the resolution of the sensed rotary mechanism position and/or mapped setting value can be directly related to the angular velocity of the rotary mechanism (e.g., wherein a given amount of angular displacement of the rotary mechanism is mapped to the same change in the sensed rotary mechanism position and/or mapped setting value irrespective of the rotary mechanism velocity). However, the sensed rotary mechanism position and/or mapped setting value can be related to the angular velocity of the rotary mechanism in any other suitable manner.

The position sensing mechanism 320 can be a rotary encoder 322, wherein the rotary encoder output can be connected to a feedback controller (e.g., PID controller), passed through low pass filter, or processed in any other suitable manner to obtain high resolution virtual positions. Alternatively, the position sensing mechanism can be a switch (e.g., a biased switch, toggle switch, etc.) or any other suitable position sensing mechanism. The position sensing mechanism can alternatively be a spring or any other suitable angular position sensing mechanism. In one example, the rotary encoder output can be mapped to 800 virtual positions along the rotation path of the rotary mechanism, wherein each virtual position can be mapped to a different receiving device setting value.

The rotary encoder 322 can be an absolute encoder, absolute multi-turn encoder, incremental rotary encoder, sine wave encoder, or be any other suitable encoder. The rotary encoder can be a mechanical encoder, conductive encoder, optical encoder, on-axis magnetic encoder, off-axis magnetic encoder, or be any other suitable encoder. In one variation, as shown in FIG. 7, the base includes a magnetic sensing element 323 and the rotary mechanism includes a magnetic element 324, wherein the angular position of the rotary mechanism can be determined from the magnetic sensing element measurements. However, the components of the rotary encoder 322 can be otherwise arranged and/or distributed. When a wireless encoder is used, any water-sensitive components (e.g., the processor, light emitting elements, etc.) can be sealed against the base by a waterproof or water-impermeable layer arranged between the rotary mechanism and the switch components (e.g., wherein the rotary mechanism can rotate about the sealed chamber), such that the switch can be used in aqueous environments. However, the switch can include a fluid-impermeable seal, liquid-impermeable seal, not include a seal, or include any other suitable sealing mechanism. Alternatively, the position sensing mechanism can be a switch (e.g., a biased switch, toggle switch, etc.) or any other suitable position sensing mechanism.

The rotary mechanism 300 preferably has the same profile as the base (e.g., a circular profile), but can alternatively have a different profile. The rotary mechanism is preferably rotatably coupled to the base, but can alternatively be otherwise coupled to the base. The rotary mechanism can include or function as a capacitive proximity sensor and be made of an electrically conductive material (e.g., brushed metal), but can alternatively be made of polymer or any other suitable material. The rotary mechanism 300 is preferably a smooth cylinder, but can alternatively include an arcuate groove along the arcuate surface, wherein the arcuate groove can have an arc length less than 360 degrees or extend along the entirety of the circumference, or have any other suitable configuration. The diameter of the rotary mechanism 300 is preferably approximately 65 mm, but can alternatively be larger or smaller.

The light emitting elements 400 of the switch 100 function to display a visual representation of the second device setting value at the switch, and can additionally or alternatively display a visual representation of other setting values available to the second device, visually reflect a change in the second device setting value, or function in any other suitable manner. In one example, when the switch 100 is controlling a set of light bulbs, a first light emitting element (e.g., reference light emitting element 420) preferably displays the same or similar hue as that displayed by the set of light bulbs, while the remainder of light emitting elements 422 display other hue options available to the light bulbs. In a second example, when the switch is controlling the set of light bulbs, the entire set of light emitting elements can emit light having the light intensity emitted by the light bulbs. In a third example, when the switch is controlling an auxiliary device, the light parameters of all or a subset of the light emitted by the light emitting elements is mapped to an operation mode of the auxiliary device (e.g., the light intensity can be correlated with the audio intensity, the light hue can be correlated with temperature setting, etc.). However, the light emitting elements can function in any other suitable manner.

Each light emitting element 400 is preferably an LED (light emitting diode), but can alternatively be an OLED (organic light emitting diode) or any other suitable light emitting element. Each light emitting element can alternatively be a cluster (e.g., multiple) light emitting elements. As shown in FIG. 2, the light emitting elements 400 are preferably configured (e.g., arranged) to direct light radially outward of the switch from the rotational axis of the rotary mechanism. Alternatively, the light emitting elements 400 can be configured to direct light in an axis parallel to the rotary mechanism rotational axis, along a vector between the rotational axis and a radial vector, or in any other suitable direction. However, the light emitting elements can be configured to direct light in any other suitable manner. In one variation, the light emitting elements 400 include active surfaces, wherein the normal vector of the active surfaces are oriented along the desired light emission vector. The light emitting elements 400 are preferably arranged in the base, but can alternatively be arranged in the rotary mechanism or in any other suitable support mechanism. The light emitted by the light emitting elements 400 is preferably blended by the diffuser or support mechanism (e.g., base or rotary mechanism), such that light from adjacent light emitting elements do not appear as distinct cones of light, but can alternatively be unblended. The light emitting elements 400 are preferably substantially equally angularly distributed about the perimeter of the switch (e.g., separated by a set angle, within a margin of manufacturing error), but can alternatively be unevenly distributed about the switch (e.g., be arranged in a line, arranged in a random pattern, arranged along one hemisphere of the switch, etc.) or be distributed in any other suitable manner. The light emitting elements 400 are preferably arranged along the entirety of the switch perimeter, but can alternatively be arranged along a portion (e.g., less than the entirety) of the switch perimeter, or along any other suitable portion of the switch. The light emitting elements are preferably arranged (e.g., mounted) in the base, more preferably within the channels but alternatively in any other suitable position, but can alternatively be arranged in the rotary mechanism or in any other suitable component.

The light emitting elements 400 are preferably connected to the processor (e.g., through a wire or wirelessly), and can be controlled by the processor, be powered by the processor, or be otherwise associated with the processor. However, the light emitting elements 400 can operate in any other suitable manner. The light emitting elements 400 are preferably individually indexed, such that each light emitting element 400 can be individually controlled by the processor. However, separate, discrete groups of light emitting elements, overlapping groups of light emitting elements, or any other suitable set of light emitting elements can be independently indexed and controlled.

The light 440 displayed by adjacent light emitting elements 400 are preferably different (e.g., have different light parameter values), but can alternatively be the same. Light 440 emitted by adjacent light emitting elements 400 are preferably interpolated, as shown in FIG. 8, such that a substantially smooth visual transition (e.g., of hue, saturation, intensity, etc.) between adjacent light emitting elements is achieved. However, adjacent light emitting elements 400 can be otherwise controlled.

The light 440 emitted by the light emitting elements 400 preferably dynamically changes as a function of the setting value and/or sensed (e.g., relative) rotary mechanism position. One or more properties of the emitted light (e.g., hue, saturation, intensity, etc.) preferably vary as a function of the angular speed of the rotary mechanism, but can alternatively vary in any other suitable manner. The rate of change of the emitted light properties can vary independent of the rotary mechanism angular velocity, but can alternatively be dependent on the rotary mechanism angular velocity. For example, the emitted light properties can change a first amount in response to a first angular displacement of the rotary mechanism when the rotary mechanism is rotated at a first angular velocity, and can change a second amount (e.g. more or less than the first amount) in response to the first angular displacement of the rotary mechanism when the rotary mechanism is rotated at a second angular velocity (e.g., faster or slower than the first velocity). However, the properties of the emitted light can change in any other suitable manner in response to rotary mechanism actuation. The switch can additionally include outputs in addition to the light emitting elements, such as audio outputs (e.g., speakers), data outputs, or any other suitable output.

The set of sensors 500 of the switch 100 functions to determine ambient environmental parameters of the switch. The ambient environmental parameters can include the orientation of the switch relative to a gravity vector, the geographical location of the switch, parameters of the ambient light, temperature, humidity, wind velocity, or sound, the identifiers of receiving devices proximal the switch (e.g., within a predetermined distance), or any other suitable ambient parameter. The set of sensors 500 can include one or more position, orientation, or inertial sensors (e.g., accelerometer, gyroscope, compass, etc.), light sensor 520 and/or camera 522 (e.g., photosensors, CCDs, etc.), microphone, capacitive proximity sensor, location sensor (e.g., GPS, WiFi triangulation, cellular tower triangulation, etc.), temperature sensor, motion sensor, audio sensor, and/or any other suitable sensor. The sensors 500 can be connected to the processor (e.g., wired or wirelessly), and can be controlled by the processor 700, send measurements to the processor, be powered by the processor, or be otherwise controlled by the processor 700. However, the sensors 500 can operate in any other suitable manner. The processor 700 preferably controls switch component operation based on the sensor measurements, but can alternatively or additionally generate instructions of auxiliary devices based on the sensor measurements, send the sensor measurements to the auxiliary devices, or use the sensor measurements in any other suitable manner.

In one example, as shown in FIG. 9, the switch 100 includes a light sensor (e.g., a camera) located in the base of the switch, wherein the light sensor can function to communicate with receiving devices. The light sensor can include an active surface, and can be arranged with the active surface at a predetermined angle relative to the external base broad face (e.g., perpendicular, parallel, at an angle therebetween, etc.). The light sensor position can be fixed or variable (e.g., controlled by the processor). In operation, the switch determines a device identifier from a signal emitted by a receiving device (e.g., a modulated light emitted by a lighting mechanism) and received by the light sensor. The signal is preferably outside of the range of human perception (e.g., the frequency of a light intensity change, the wavelength of light or audio is outside the range of human perception, etc.), but can alternatively be within the range of human perception. The switch can subsequently connect to the receiving device identified by the device identifier and control the setting values of the identified receiving device. Alternatively, a light parameter value (e.g., hue) can be determined from the camera measurements, and control instructions for an auxiliary device can be generated based on the light parameter value (e.g., for the light emitting elements and/or light bulbs to emit light having the hue). However, the camera measurements can be used in any other suitable manner.

In a second example, the switch 100 includes an inertial sensor (e.g., an accelerometer, gyroscope, digital compass, etc.) located in the base of the switch, wherein the inertial sensor measures the orientation of the switch relative to a reference point 900. The reference point can be a force vector (e.g., a gravity vector or force vector applied by a user), magnetic north, the geographic or physical location of an auxiliary device (e.g., a light bulb, television, etc.), or be any other suitable external reference point. The switch can control light emitting element operation, generate control instructions for auxiliary devices, and/or control any other suitable device based on the sensor measurement. For example, the switch can determine the orientation of the switch relative to a force vector and set a light emitting element as the reference light emitting element based on the light emitting element angular position relative to the force vector. In a second example, the switch can determine the orientation of the switch relative to the force vector (e.g., gravity vector), wherein switch 100 or switch component (e.g., base, knob, etc.) rotation relative to the force vector can map to changes in a switch setting (e.g., increase or decrease intensity, change colors, etc.). However, the inertial measurements can be otherwise used.

The communication mechanism 600 of the switch functions to communicate (e.g., transmit and receive) data from a second system. The second system can be the receiving device, a sending device (e.g., a mobile phone of a user, a remote computing system or server, etc.), or any other suitable device. The communication mechanism preferably includes a transmitter and a receiver. The switch can include any suitable number of communication mechanism technologies. The communication mechanism can be a wired (e.g., a power line communication system, a cabled data transfer mechanism, such as USB or Firewire, etc.) or wireless communication mechanism (e.g., WiFi, cellular, Bluetooth, light, audio, etc.), wherein the wireless communication mechanism can include an antenna (arranged parallel the axis of rotation, along the axis of rotation, perpendicular the axis of rotation, tracing the perimeter of the knob or base, or otherwise arranged within the switch) or other component. The communication mechanism is preferably enclosed between the knob and the base, but can alternatively be arranged outside the knob and base, or be arranged in any other suitable location. The communication mechanism can connect to a router located within a predetermined distance of the switch, connect with a receiving device to set up a mesh network, or connect to the second system in any other suitable manner.

The processor 700 of the switch 100 functions to control the switch components. The processor 700 can receive and/or send control signals from and/or to the wireless communication mechanism; process measurements from the set of sensors; individually control each light emitting element based on the control signals, signal measurements, or other data; or control the switch components in any other suitable manner. The processor 700 is preferably connected to all active switch components (e.g., light emitting elements 400, sensors 500, communication module 600, power system, etc.), but can alternatively be connected to a subset of the active switch components or be connected to any other suitable set of components. The processor can be wired to the switch components (e.g., electrically connected) or be wirelessly connected to the switch components. The processor 700 is preferably enclosed within the base and rotary mechanism, but can alternatively be external the base and rotary mechanism, arranged within the base or rotary mechanism, or be arranged in any other suitable position. The processor can be arranged on the same board as the wireless communication mode, light emitting elements, power system, sensors, and/or other active components, or be arranged on a separate board. The processor can be a microprocessor, GPU, CPU, or be any other suitable computing system.

The power system 720 of the switch 100 functions to power the switch. The power system 720 preferably includes a power storage mechanism 722 and/or a power supply 724, but can alternatively include any other suitable power component. The power storage mechanism preferably includes a battery, more preferably a rechargeable (e.g., secondary) battery, such as a lithium ion battery, lithium ion polymer battery, nickel cadmium battery, or any other suitable secondary battery. Alternatively, the power storage mechanism can be a capacitor, a primary battery, or any other suitable power storage mechanism. The power supply of the power system functions to provide power to the power storage mechanism and/or power directly to the computing mechanism (e.g., PCB, etc.) of the switch. The power supply can be a wired power supply (e.g., a USB cable or any other suitable power cable), a wireless power supply (e.g., an inductive charger, RF-powered system, etc.), a kinetic power supply (e.g., that harvests power from rotary mechanism actuation), a solar power supply, or any other suitable power supply.

The switch 100 can additionally include a charger that functions to provide power to the power system. The charger can be a wired charger (e.g., a transiently or permanently coupled power cable, such as a USB cable, power line, standard power adapter or base, etc.), a wireless charger (e.g., induction coil, example shown in FIG. 6C, RF receiver, microwave receiver, etc.), or be any other suitable charger. The charger can be enclosed between the base and rotary mechanism, but can alternatively entirely or partially extend beyond the base (e.g., perpendicular to the axis of rotation, parallel the axis of rotation, etc.), or be arranged in any suitable configuration.

2. Method for Switch Operation.

The method for switch operation includes emitting light in response to a display event S100, receiving rotary mechanism actuation S200, and transmitting control information to a receiving device S300. The method for switch operation functions to control the visual output of the switch. The method can additionally function to control the audio, data, or any other suitable output of the switch. The method is preferably performed by the switch described above, but can alternatively be performed by any other suitable switch. More preferably, the method is performed by a computing mechanism of switch (e.g., as described above), but can alternatively be performed by a computing system remote from the computing mechanism of the switch (e.g., a remotely connected device, such as a server, mobile device, or any other suitable device). Alternatively, the switch can be mechanically controlled or otherwise controlled.

Emitting light in response to a display event S100 functions to visualize the initial setting of the receiving device. The display event can include receiving an actuation force (e.g., rotational force or linear force) at the rotational mechanism, detecting user presence or proximity (e.g., detecting connection of a user device to a local network, detecting a user device location within a predetermined geographic region, detecting user proximity with the capacitive proximity sensor, detecting motion with the camera, etc.), detecting switch translation, receiving a notification from a remote device, detecting a change in an ambient environment parameter above a predetermined change threshold, or detecting any other suitable display event.

Emitting the light S100 preferably includes identifying a light emitting element of the plurality of light emitting elements as a reference light emitting element and displaying a visual indicator indicative of the initial setting value for the receiving device at the reference light emitting element. The reference light emitting element 420 can be an individual light emitting element, a contiguous cluster or group of light emitting elements (e.g., a subset of the switch light emitting elements), or any other suitable combination of switch light emitting elements. Emitting the light can additionally include controlling the remainder of the light emitting elements of the set to display visual indicators indicative of other setting values available for the second device. Light is preferably emitted by all or a subset (e.g., less than the entirety of the set) of the set of light emitting elements of the switch.

Identifying a reference light emitting element (origin light, first light emitting element, indexing light emitting element) functions to identify the light emitting element that a user will recognize as indicative of the receiving device setting value. The reference light emitting element 420 additionally functions as a reference point (e.g., a position reference point or setting reference point) for determining the operation parameters of the remainder of the light emitting elements 422.

In a first variation, the reference light emitting element can be a predetermined light emitting element, wherein the predetermined light emitting element can always display the visual indicator indicative of the receiving device setting value. The switch can additionally include an indicator (e.g., a notch) that functions to indicate which light emitting element is the reference light emitting element.

In a second variation, the reference light emitting element is dynamically selected. The reference light emitting element (e.g., selected light emitting element) can be the light emitting element(s) substantially aligned along a force vector (e.g., the light emitting element(s) most proximal the force vector), the light emitting element(s) that most opposes the direction of a determined force vector or force displacement direction (e.g., the uppermost light emitting element(s) when the switch is mounted on a vertical surface or when the force vector is a gravity vector), the light emitting element(s) that is furthest along the force vector (e.g., the lowermost light emitting element when the force vector is a gravity vector), the light emitting element(s) at a predetermined direction to the force vector (e.g., the rightmost light emitting element when the force vector is a gravity vector), or any other suitable light emitting element satisfying a position condition relative to the force vector. The force vector can be a gravity vector (as shown in FIG. 10) or any other suitable force vector. The force vector can be determined by a position sensor of the switch (e.g., accelerometer or gyroscope), a location sensor, or any other suitable sensor. Alternatively, the force vector can be a landing force (e.g., wherein the switch is being translated), as shown in FIG. 11, or be any other suitable force vector. The selected light emitting element(s) are preferably the light emitting element(s) proximal the force vector intersecting the rotational axis opposing the direction of the force vector. However, the first light emitting element(s) can be selected in any other suitable manner.

Displaying a visual indicator indicative of the initial setting value for the receiving device at the first light emitting element can include determining the setting value and controlling the parameters of the light emitted by the first light emitting element based on those values associated with the setting value for the receiving device. Determining the setting value can include requesting the setting value from the receiving device, retrieving the setting value from on-board memory, retrieving the setting value from a remote storage location, measuring the setting value from signals emitted by the receiving device (e.g., from the parameter controlled by the setting value, such as the light emitted by a light), or determining the setting value in any other suitable manner.

The setting value is preferably the substantially instantaneous setting value for the receiving device, but can alternatively be a future setting value (e.g., the setting value for the receiving device in 30 minutes), a prior setting value (e.g., the setting value for the receiving device an hour ago), or any other suitable setting value. For example, the setting value can be the hue that is currently being emitted by a secondary light controlled by the switch. The setting value is preferably stored by the receiving device and received in response to occurrence of the display event, but can alternatively be stored by the switch or stored by any other suitable device. The setting value can be stored in response to receipt of the setting value from a sending device (e.g., mobile phone), in response to the occurrence of an association event (e.g., storage event), or in response to any other suitable event. The association event can be the rotary mechanism angular speed falling below a predetermined angular velocity threshold (e.g., below 0 rpm, below 0.5 rpm, etc.), be the receipt of an actuation force along a vector parallel to the rotational axis, or be any other suitable association event.

Figure 12:
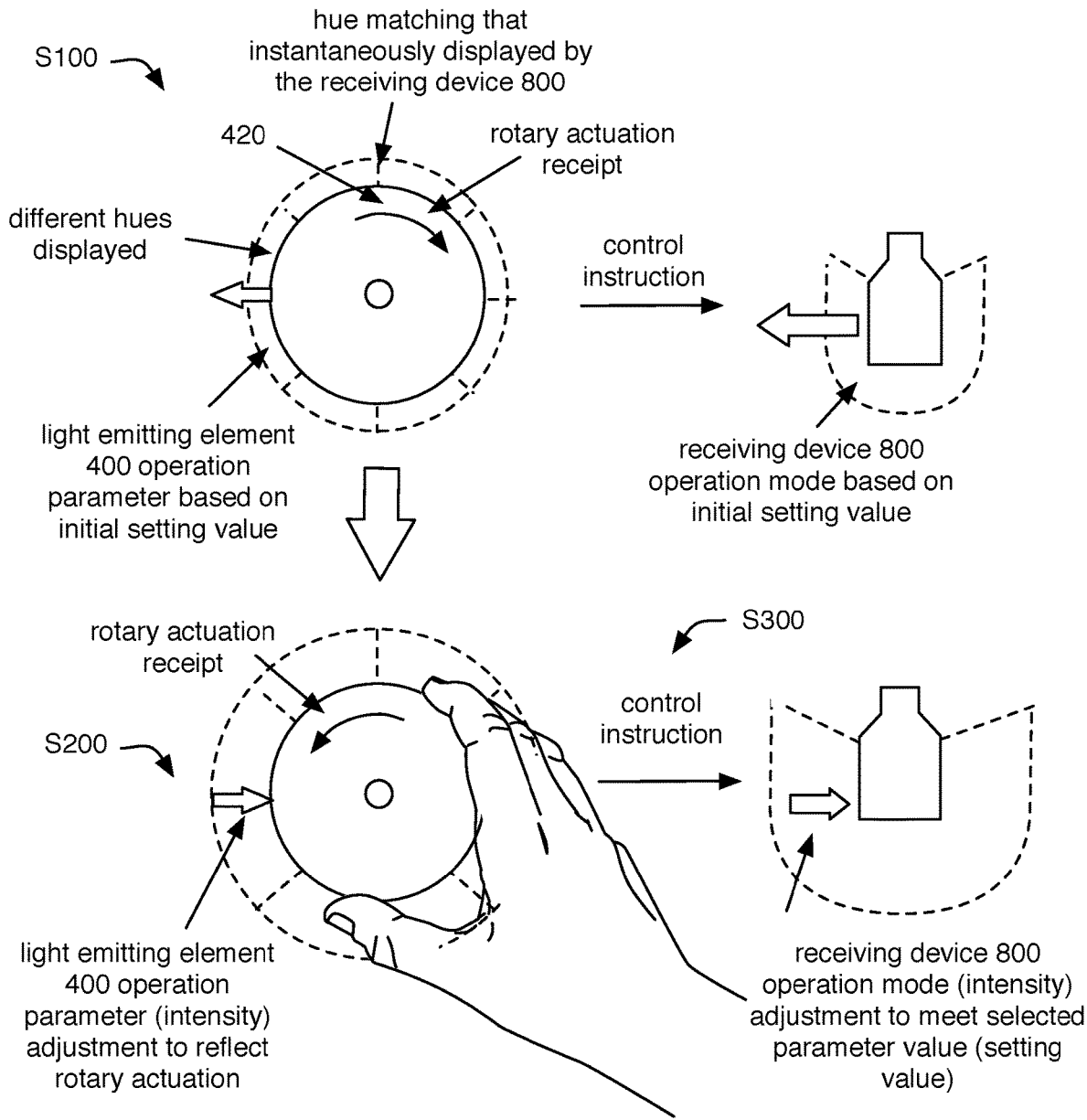
FIG. 12 is a schematic representation of a variation of switch and receiving device operation in response to receipt of a first rotary mechanism actuation.

Controlling the reference light emitting element to emit light having reference parameter values, based on the stored setting value for the receiving device functions to present a visual representation of the initial setting value, as shown in FIG. 12. The light parameters that can be controlled include the light intensity (e.g., luminous intensity), the light hue (e.g., frequency or wavelength of the light), the light saturation, the light colorfulness, the light chroma, the frequency of light modulation (e.g., the frequency at which power to the light is increased or decreased), polarization, direction, blending, or any other suitable parameter. The light parameters preferably vary as a direct function of the setting value (e.g., control instructions), but can alternatively vary inversely as a function of the setting value, vary as a function of an ambient environmental parameter, vary as a combination of the above, or vary in any other suitable manner. The light parameter values can be selected from a map, graph, chart, formula, empirically determined, retrieved from a storage system, or be determined in any other suitable manner based on the setting value.

In one variation of the method, one or more parameters of the emitted light vary as a function of the energy of the signal emitted by the receiving device. For example, the light intensity can increase with setting values indicative of increased volume of a secondary audio device. In another example, the light intensity can increase with setting values indicative of increased light intensity for a secondary lighting device. Setting values for one or more parameters of the receiving device can be simultaneously represented, wherein different light parameters are preferably indicative of different receiving device parameters. For example, the hue and intensity of the light emitted by the secondary lighting device can be simultaneously represented by the hue and intensity of the light emitted by the first light emitting element, wherein the hue and intensity of the light emitted by the first light emitting element can match, be corrected by a correction factor (e.g., be 10% of the intensity of the light emitted by the secondary lighting device), or otherwise be related to the setting values of the secondary lighting device. In another example, the hue and intensity of the light emitted by the first light emitting element can be dependent upon one or more ambient environmental parameters. In a specific example, the intensity of the emitted light can decrease with decreased detected ambient light, and increase with increased detected ambient light. In another specific example as shown in FIG. 7, the colorfulness of the emitted light can decrease with decreasing temperature and increase with increasing temperature. In another specific example, the hue or saturation of the emitted light can be adjusted toward a first wavelength (e.g., become more blue) with decreasing temperature and adjusted toward a second wavelength (e.g., become more red) with increasing temperature. However, the emitted light parameters can be determined in any other suitable manner.

Emitting light in response to a display event S100 can additionally include controlling one or more of the remainder of the set of light emitting elements to display light. In one variation, all of the remainder of the light emitting element set are lit. In a second variation, a subset of the remainder of the light emitting element set is lit. In one example, every other light emitting element is lit. In another example, only the light emitting elements within an arcuate distance of the first light emitting element are lit (e.g., light emitting elements along a continuous arcuate portion of the switch less than 360 degrees from the first light emitting element or other reference point are used). However, any other suitable subset of the light emitting elements can be used.

The light displayed by the remainder of the light emitting elements is preferably indicative of other setting value options for the receiving device, but can alternatively be indicative of the instantaneous setting value for the receiving device (e.g., have the same light parameter as the first light emitting element), or be indicative of any other suitable information or receiving device parameter. Similar to the first light emitting element, the parameters of the light displayed by the remainder of the light emitting elements be indicative of different receiving device parameters, be indicative of the same receiving device parameter, or be independent of the receiving device setting values. When the remainder of the light emitting elements display other setting value options for the receiving device, the parameter values are preferably interpolated between adjacent light emitting elements, such that the transition between adjacent light emitting elements is substantially smooth and continuous. Alternatively, parameter values for adjacent light emitting elements can be discretized or otherwise controlled. In one specific example wherein the switch controls a secondary lighting device, the remainder of the set of light emitting elements emits light having the same intensity and saturation as the first light emitting element, but different hues from the first light emitting element, wherein each hue is indicative of a hue that can be emitted by the secondary lighting device.

In one example, each successive light emitting element from the reference light emitting element (e.g., each light emitting element adjacent the prior light emitting element) emits light with a parameter value adjacent (e.g., sequentially following or preceding) the prior light parameter value. The relationships between the parameter values are preferably determined from a substantially continuous virtual map (e.g., continuum), chart, or other virtual relationship structure, but can alternatively be otherwise determined. In a first specific example, the first light emitting element can emit a red light, a second light emitting element adjacent the first light emitting element can emit a purple light, and a third light emitting element (adjacent the second light emitting element and distal the first) can emit a blue light, when red, purple, and blue are adjacent each other on the reference color map. The light emitted by the remainder of the set of light emitting elements are preferably interpolated, such that the other hue options appear as a blended continuum about the perimeter of the switch (e.g., wherein each light emitting element of the set emits a different hue light), but can alternatively be discretized (e.g., wherein a subset or several adjacent light emitting elements all emit the same hue light) or otherwise controlled.

In a second example, the light emitting elements can additionally or alternatively display the same, similar, or relative intensity (e.g., reduced by a correction factor) as the set of lights. An example application is when the switch is controlling an air conditioning system, the light emitting elements preferably cooperatively display a visual representation of the temperature, with an increased proportion of the light emitting elements displaying blue lights in response to the temperature setting falling below a temperature threshold, and an increased proportion of the light emitting elements displaying red lights in response to the temperature setting exceeding a second temperature threshold. However, the light emitting elements can display any other suitable visual representation of the second device settings, notifications, or any other suitable information. However, the set of light emitting elements can be otherwise operated.

Receiving rotary mechanism actuation S200 functions to receive a user input at the switch. The rotary mechanism actuation can be an arcuate actuation (e.g., rotation of the rotary mechanism), a linear actuation, or any other suitable actuation. The parameters of the light emitting elements can additionally change in response to actuation receipt. In particular, the parameters of the light emitting elements preferably vary directly with the setting value change for the receiving device. However, the light emitting elements can be otherwise operated.

For example, in response to receipt of knob rotation in a first arcuate direction (first angular direction), light having the specified parameter values can be sequentially emitted along the series of light emitting elements in the first arcuate direction, such that each sequential light emitting element emits the light previously emitted by a prior light emitting element adjacent the subsequent light emitting element in a second arcuate direction opposing the first arcuate direction. In the first specific example above, the second light emitting element is arranged in a clockwise position relative to the first light emitting element, and the third light emitting element is arranged in a clockwise position relative to the second light emitting element. In response to clockwise knob rotation, the second light emitting element can emit the red light, the third light emitting element can emit the purple light, and the first light emitting element can emit light having a hue adjacent red on the reference map, opposing purple (e.g., orange). The switch preferably generates control instructions based on the light emitted by a reference light emitting element (e.g., the first light emitting element). For example, when the switch is controlling a light bulb, the switch can send control instructions to the light bulb to emit light emitted by the reference light emitting element. The lights preferably index as a function of rotation speed (e.g., angular speed), but can alternatively index in any other suitable manner. Alternatively, the light emitting elements can rotate, relative to the base, in response to knob rotation (e.g., wherein the light emitting elements can be mounted to the rotary mechanism or a secondary rotation mechanism controlled by the rotary mechanism). However, the light emitting elements can respond in any other suitable manner to knob actuation.

The resistance of the rotary mechanism can additionally be dynamically adjusted. The resistance can be adjusted based on the operation mode of the rotary mechanism, the receiving device controlled by the switch, the ambient environment parameters, the distance along a continuum of the mapped setting value, the determined register (e.g., event), or any other suitable parameter. The resistance can be adjusted by increasing or decreasing the current provided to the rotary encoder or a rotary drag mechanism, increasing or decreasing a spring force, or otherwise adjusting the resistance.

Receiving rotary mechanism actuation can additionally include translating the actuation into a control signal, as shown in FIG. 12. A parameter of the actuation (e.g., the distance of rotary mechanism movement, the duration of rotary mechanism actuation, etc.) is preferably translated into a control command for the switch or a control command (e.g., a setting value change) for the receiving device.

Figure 13:
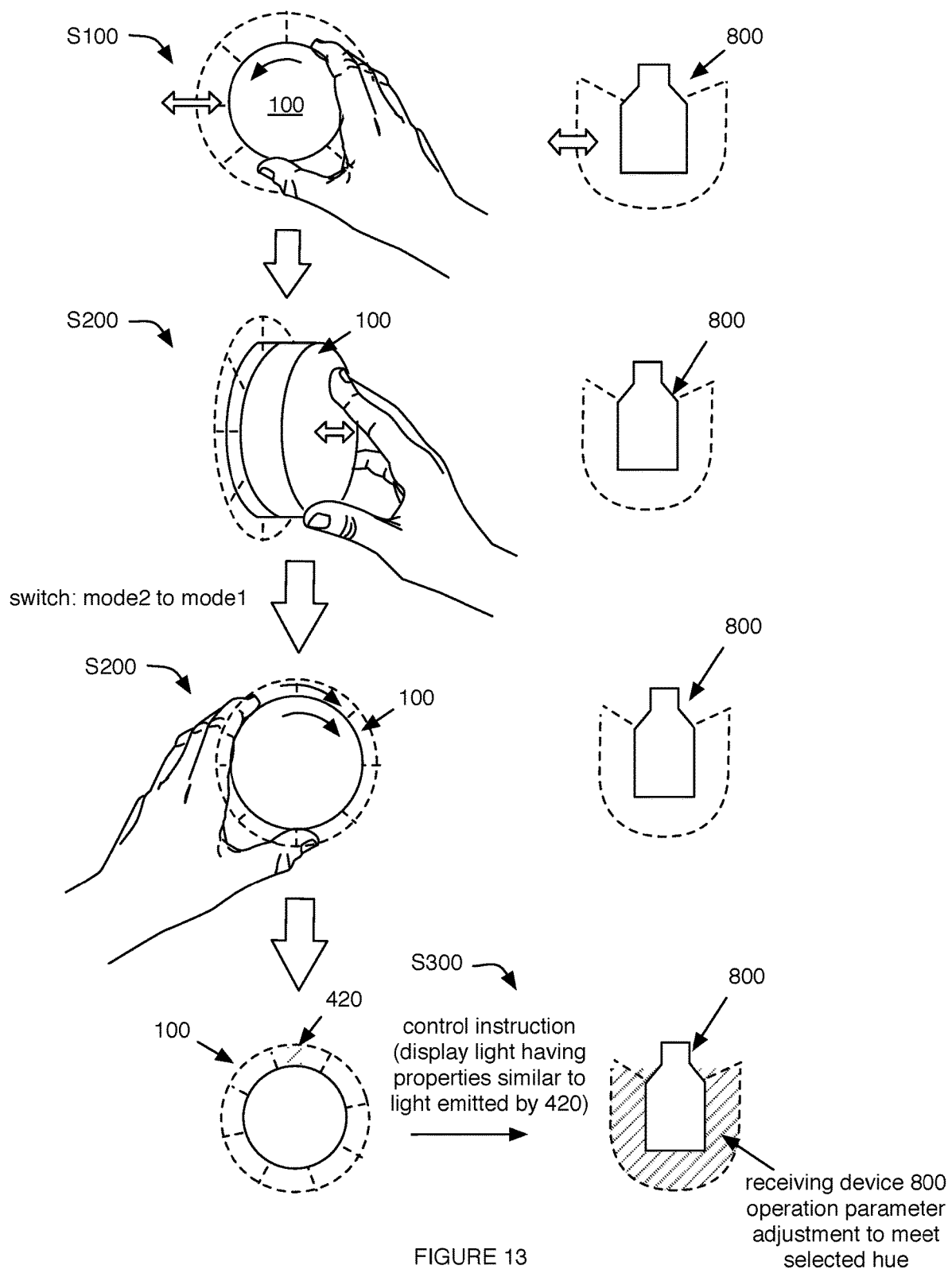
FIG. 13 is a schematic representation of an example of a second variation of switch and receiving device operation in response to receipt of a first rotary mechanism actuation and second rotary mechanism actuation.

In a first variation of the method, as shown in FIG. 13, the switch can be operable between a plurality of modes, wherein switch actuation (e.g., preferably linear rotary mechanism actuation but alternatively rotational rotary mechanism actuation, switch tilting, or any other suitable actuation) preferably switches switch operation between each of the plurality of modes. Switch actuation can switch between controlling each of a plurality of receiving device parameters (e.g., hue, intensity, volume, etc.), switch between receiving device themes that are user determined or preset (e.g., adjusting a light between a set of different white lights), switch between different receiving devices, or control any other suitable set of receiving device parameters or devices. In one variation of the system, the rotary mechanism is placed in a shutoff mode wherein power provided to the system components is dropped below a threshold value in response to determination of switch inversion. Each mode is preferably associated with a different set of light emitting element operation responses to rotary mechanism actuation, but can alternatively be associated with the same set of light emitting element operation responses. The modes can be automatically determined based on the associated receiving device, manually specified by a user (e.g., at a mobile device, such as a smartphone or tablet), or otherwise determined.

In one example, as shown in FIG. 13, the switch is operable between a first and second mode, wherein the first mode controls the hue of the light emitted by a light bulb, and the second mode controls the intensity (e.g., brightness) of the light emitted by the light bulb. In the first mode, the reference light emitting element(s) of the switch preferably concurrently emits light having the hue of the light bulb with the light bulb, while the remainder of the light emitting elements emit light having other hue options for the light bulb. The switch and light bulb can be synchronized based on a common remote server, based on a master device (e.g., a local router, light bulb, the switch, a user device, etc.), or be otherwise synchronized. However, the switch and lightbulb can remain unsynchronized or be synchronized in any other suitable manner. In the second mode, all the light emitting elements of the switch emit light having the intensity of the light emitted by the light bulb. The switch can additionally be operable in a third mode, wherein switch actuation controls operation of a secondary device (e.g., a thermometer, radio, etc.) and the light emitting elements of the switch display light having parameter values corresponding to the selected secondary device operation mode. However, the switch can be operable between any other suitable number of modes. The switch can be switched between the modes in response to linear actuation along the rotational axis, and controlled within each mode in response to angular or arcuate actuation about the rotational axis, but can alternatively be switched between the modes or operated within each mode in any other suitable manner.

In a second variation of the method, rotation of the rotary mechanism generates a control instruction to change the energy of the signal emitted by the receiving device. The signal emitted by the receiving device can be wavelength output (e.g., audio or light), signal intensity output, thermal output, or any other suitable signal output. In particular, the arcuate distance of rotary mechanism actuation (e.g., from a reference or starting point) is preferably translated into a change in the setting value. However, the rate of rotary mechanism actuation, the amount of applied actuation force, the actuation duration, or any other suitable parameter can be translated into a change in the setting value. The setting value can be calculated, selected (e.g., from a chart or graph), or otherwise determined based on the actuation parameter. The conversion can be performed by the switch, the receiving device, a remote device, or by any other suitable computing mechanism. The parameters of the light emitting elements preferably change to reflect the anticipated setting value change, but can alternatively be otherwise operated. The light emitting element parameters can change before, after, or concurrently with receiving device parameter adjustment.

In one example, rotary mechanism actuation changes the operation parameters of the light emitting elements, wherein the parameters of the first light emitting element is determined in response to a record event, optionally translated into a setting value for the receiving device parameter being controlled (e.g., before, after, or concurrently with light emitting element parameter determination), and sent to the receiving device, wherein the receiving device is subsequently controlled to substantially meet the setting values. The record event is preferably determination that the rotary mechanism angular velocity has fallen below a predetermined threshold, but can alternatively be the occurrence of a predetermined period of time or be any other suitable event.

In another example, rotary mechanism actuation concurrently changes the setting value of the receiving device parameter and the light emitting element parameter associated with the receiving device parameter. In this variation, light emitting element parameter and receiving device parameter adjustment can be decoupled, but are preferably controlled to change at substantially the same rate such that the adjustments appear to be related.

In a third variation of the method, rotation of the rotary mechanism can generate a rotational signal for computer control, wherein a virtual object displayed on the display of the computer (the receiving device) rotates at the speed of rotary mechanism rotation, or a portion of thereof. Alternatively, rotary mechanism actuation can generate a transformation signal for computer control (e.g., zoom in and out based on the direction and magnitude of the delta values), or perform any other suitable action on the computer.

Linear translation of the switch in a plane perpendicular to the axis of rotation is preferably displayed as linear translation of a virtual object (e.g., a pointer) on the display. Linear translation can be determined by the position sensor of the switch and/or the camera of the switch (e.g., using a laser system). However, rotary mechanism actuation can be otherwise converted into receiving device control. However, the receiving device parameters can be otherwise changed. The method can include a combination of the aforementioned variations or any other suitable method of converting switch actuation into a control signal for the switch and/or receiving device.

Transmitting control information to a receiving device S300 functions to control the setting value based on the user input. The control information can be a setting value for the receiving device, be the determined actuation parameter (e.g., wherein the receiving device determines the setting value based on the actuation parameter), or be any other suitable information. Alternatively or additionally, the control information can be sent to a third intermediary device, wherein the intermediary device processes the control information received from the switch into control instructions for the receiving device, based on instruction maps, functions, algorithms, user preferences, or any other suitable information. The control instructions are then transmitted to the receiving device. The control information can be transmitted through a wireless connection, such as a cellular connection, a WiFi connection (e.g., on the same or different networks), near-field connections (e.g., Bluetooth, NFC, RF, audio signals, etc.), or any other suitable wireless connection. The setting value can alternatively be transmitted through a wired connection, such as powerline transmission or cabled data transmission. The setting value is preferably sent by the switch as soon as the value is determined by the switch (e.g., substantially concurrently with receipt of rotary mechanism actuation), but can alternatively be sent after the resting rotary mechanism position is set (e.g., in response to receipt of a setting actuation pattern), or sent in any other suitable manner. However, the control information can be otherwise transmitted to the receiving device.

The method can additionally include automatically controlling switch operation and/or receiving device operation. Switch operation and/or receiving device operation can be automatically controlled based on historical operation parameters (e.g., wherein user preferences or patterns can be learned using machine learning algorithms or otherwise determined), context, user preferences (e.g., based on a user population and a specific user profile associated with the switch), user determined settings (e.g., from user settings), user calendar events, or determined based on any other suitable piece of information. For example, the switch can automatically adjust the receiving device parameter to a first setting value (e.g., a first light intensity value) in response to the occurrence of an event (e.g., determination that the time is 6 PM), based on historical user interactions with the switch (e.g., the user historically adjusts the light intensity to a value within a predetermined range of the first light intensity value at or around 6 PM). In another example, the switch can automatically adjust switch operation based on the ambient environment parameters. In a specific example, power provision to the light emitting elements and/or communication system is shut off after there has been a lack of proximal user detection for a predetermined period of time or the ambient light falls below a predetermined intensity threshold. In another example, the switch can automatically adjust switch operation based on information received from a remote computing device. For example, the switch can operate in a first mode in response to receipt of a first notification, and operate in a second mode in response to receipt of a second notification. In another specific example, power provision to the light emitting elements and/or communication system is turned on or the increased in response to receipt of a sun-set notification from a remote server. However, the system and method can include any suitable combination of the aforementioned elements.

As a person skilled in the art will recognize from the previous detailed description and from the figures and claims, modifications and changes can be made to the preferred embodiments of the invention without departing from the scope of this invention defined in the following claims.

We claim:

1. A method for control of a luminaire group comprising:
   at a first light element of a switch, emitting light with first set of characteristics associated with an initial setting value for the luminaire group;
   at a second light element of the switch, emitting light with a second set of characteristics associated with a second setting value for the luminaire group, wherein the second set of characteristics is different from the first set of characteristics and the second setting value is different from the initial setting value;
   controlling the luminaire group based on the initial setting value;
   receiving an input at an input mechanism of the switch associated with a position of the second light emitting element;
   in response to receiving the input, emitting light with the second set of characteristics at the first light element of the switch; and
   within a threshold time interval, controlling a first and second subset of the luminaire group based on the second setting value using wired powerlines and wireless communications, respectively.

2. The method of claim 1, further comprising: within a threshold time interval, controlling the luminaire group based on the second setting value.

3. The method of claim 1, wherein the position comprises an angular position about an axis of the switch.

4. The method of claim 1, wherein the second setting value comprises a shutoff mode wherein a power provision to the luminaire group is below a threshold value.

5. The method of claim 1, wherein the switch is connected to a power supply, wherein each luminaire of the luminaire group is electrically connected to the switch.

6. The method of claim 5, wherein the switch and each luminaire of the luminaire group are connected to a Wi-Fi network.

7. The method of claim 1, wherein the input mechanism comprises a touch sensor.

8. A lighting control system comprising:
   a base configured to mount to a wall;
   an input mechanism configured to mount to the base;
   a processor arranged between the base and the input mechanism and electrically connected to the input mechanism, wherein the processor is configured to communicatively connect to a plurality of luminaires,
   wherein the processor is configured to determine a lighting mode, comprising:
     controlling a reference light to emit light having a first parameter value associated with an initial setting value;
     controlling a second light to emit light having a second parameter value associated with a second setting value, the second parameter value different from the first parameter value and the second setting value being different from the initial setting value; and
     at the processor, determining the second setting value based on receipt of a signal from an input device, wherein the reference light and the second light are controlled based on the signal;
   wherein, in response to receipt of a second user input at the input mechanism, the processor is configured to control the plurality of luminaires to operate at the second setting value.

9. The lighting control system of claim 8, wherein the input device comprises the processor and the input mechanism.

10. The lighting control system of claim 8, wherein the processor is further configured to electrically connect to each of the plurality of luminaires, wherein the processor is further configured to electrically connect to a power supply, wherein the processor is configured to control a power provision to each of the plurality of luminaires based on the receipt of the second user input.

11. The lighting control system of claim 10, wherein the first setting value is associated with a first set of lighting elements of the plurality of luminaires and the second setting value is associated with a second set of lighting elements of the plurality of luminaires, wherein controlling the plurality of luminaires to operate at the second setting value comprises controlling a power provision to each of the second set of lighting elements.

12. The lighting control system of claim 8, wherein the second setting value comprises a light color and an emission intensity associated with the light color.

13. The lighting control system of claim 8, wherein the second setting value is stored within a memory of at least one of: a lighting of the plurality and the lighting control system.

14. The lighting control system of claim 8, wherein the base comprises a plurality of light channels, wherein the input mechanism comprises a touch sensor mechanically coupled to a diffuser, wherein a broad face of the diffuser encloses each of the plurality of light channels.

15. The lighting control system of claim 8, further comprising a Wi-Fi communication system connected to the processor.

16. The lighting control system of claim 8, wherein the base comprises a circular cross section.

17. A method comprising:
- determining a luminaire group comprising a plurality of luminaires;
- controlling a reference luminaire to emit light having a first set of characteristics associated with an initial setting value for the luminaire group;
- controlling a second luminaire to emit light having a second set of characteristics associated with a second setting value, the second set of characteristics different from the first set of characteristics and the second setting value different from the initial setting value;
- at a remote device, receiving a user input;
- in response to receipt of the user input, controlling the reference luminaire to emit light having the second set of characteristics; and
- sending a signal to the luminaire group to operate at the second setting value.

18. The method of claim 17, further comprising: within a threshold time of receiving the user input, operating at the second setting value at the remote device.

19. The method of claim 17, wherein the user input comprises an angular position about an axis of the remote device, wherein the angular position is associated with the second setting value.

* * * * *